(12) United States Patent
Stählin et al.

(10) Patent No.: US 8,896,467 B2
(45) Date of Patent: Nov. 25, 2014

(54) METHOD FOR POSITIONING AND VEHICLE COMMUNICATION UNIT

(75) Inventors: Ulrich Stählin, Eschborn (DE); Marc Menzel, Weimar/Lahn (DE); Stephan Zecha, Hoesbach (DE); Oliver Scherf, Bessenbach (DE)

(73) Assignee: Continental Teves AG & Co. oHG (DE)

( * ) Notice: Subject to any disclaimer, the term of this patent is extended or adjusted under 35 U.S.C. 154(b) by 505 days.

(21) Appl. No.: 13/376,295

(22) PCT Filed: Jun. 7, 2010

(86) PCT No.: PCT/EP2010/057909
§ 371 (c)(1),
(2), (4) Date: Feb. 21, 2012

(87) PCT Pub. No.: WO2010/139806
PCT Pub. Date: Dec. 9, 2010

(65) Prior Publication Data
US 2012/0139761 A1    Jun. 7, 2012

(30) Foreign Application Priority Data
Jun. 5, 2009  (DE) .......................... 10 2009 026 792

(51) Int. Cl.
| | | |
|---|---|---|
| *G08G 1/123* | (2006.01) | |
| *G01S 13/78* | (2006.01) | |
| *H04W 40/00* | (2009.01) | |
| *G01S 3/02* | (2006.01) | |
| *G01S 13/74* | (2006.01) | |
| *G01S 13/00* | (2006.01) | |

(52) U.S. Cl.
CPC .................................. *G01S 13/781* (2013.01)
USPC ............. 340/989; 455/445; 342/455; 342/43; 342/36

(58) Field of Classification Search
CPC ...... G08G 1/205; G08G 1/127; G01S 13/831; G01S 2013/9353
USPC ................ 340/989; 455/445; 342/455, 43, 36
See application file for complete search history.

(56) References Cited

U.S. PATENT DOCUMENTS

| | | | |
|---|---|---|---|
| 5,070,334 A | 12/1991 | Commissaire | |
| 6,289,209 B1 * | 9/2001 | Wood, Jr. .................. | 455/277.1 |

(Continued)

FOREIGN PATENT DOCUMENTS

| | | |
|---|---|---|
| EP | 0389325 A1 | 9/1990 |
| WO | WO-2009074655 A1 | 6/2009 |

OTHER PUBLICATIONS

International Application Serial No. PCT/EP2010/057909, International Search Report mailed Oct. 27, 2010, 6 pgs.

(Continued)

*Primary Examiner* — Jack K Wang
(74) *Attorney, Agent, or Firm* — RatnerPrestia

(57) ABSTRACT

Methods and an appropriately setup communication unit for positioning in vehicle-to-surroundings communication are described, wherein the method involves a first sensor (S1) of a first communication subscriber using a transmission and reception unit to emit a challenge pulse, to which a transmission and reception unit of a second sensor (S2) of a second communication subscriber responds with a response pulse. The response pulse is received and evaluated by the first sensor (S1) and positioning is performed. In order to achieve reliable cooperative sensor communication, the transmission and reception units of the first and second sensors (S1, S2) use a frequency band (SCH2) which is reserved for vehicle-oriented safety applications.

11 Claims, 3 Drawing Sheets

(56) References Cited

U.S. PATENT DOCUMENTS

| | | |
|---|---|---|
| 7,136,016 B1 | 11/2006 | Swensen |
| 7,233,795 B1 | 6/2007 | Ryden |
| 2003/0142002 A1 | 7/2003 | Winner |
| 2006/0153123 A1* | 7/2006 | Friedrich ................. 370/328 |
| 2009/0117855 A1* | 5/2009 | Rofougaran ................ 455/73 |
| 2010/0226291 A1* | 9/2010 | Gorbachov ................. 370/280 |
| 2011/0026472 A1* | 2/2011 | Reumerman et al. ......... 370/329 |
| 2011/0098877 A1 | 4/2011 | Stählin |
| 2012/0134342 A1* | 5/2012 | Le et al. .................... 370/336 |

OTHER PUBLICATIONS

Hess, Soeren, "Spectrum and Standardization", World Class Standards, ITS Safety 2010 Symposium, Tokyo (Feb. 23-27, 2009), 25 pgs.

* cited by examiner

METHOD FOR POSITIONING AND VEHICLE COMMUNICATION UNIT

CROSS REFERENCE TO RELATED APPLICATIONS

This application is the U.S. National Phase Application of PCT/EP2010/057909, filed Jun. 7, 2010, which claims priority to German Patent Application No. 10 2009 026 792.1, filed Jun. 5, 2009, the contents of such applications being incorporated by reference herein.

FIELD OF THE INVENTION

The invention relates to a method for positioning, i.e. for ascertaining the position of a communication subscriber, in vehicle-to-surroundings communication (C2X), which covers both vehicle-to-vehicle communication (C2C) and vehicle-to-infrastructure communication (C2I), and to a vehicle communication unit which is set up to carry out said method.

BACKGROUND OF THE INVENTION

Within the context of cooperative sensor communication, the method has provision for a first sensor of a first communication subscriber to use a transmission and reception unit to emit a challenge pulse, to which a transmission and reception unit of a second sensor of a second communication subscriber responds with a response pulse, wherein the response pulse is received and evaluated by the first sensor and positioning is performed. This positioning is, thus effected from cooperative sensor communication, i.e. using information ascertained during this sensor communication.

Within the context of the vehicle-to-surroundings communication (C2X), according to the present level of research, typically a network of transmitters and receivers participating in the communication is set up, the setup of such an adhoc network requiring knowledge of the positions of the transmitters and receivers. This is typically done using positioning which stems from a satellite-based locating, for example GPS, Galileo or the like. Many instances of application for safety applications, for example junction assistance or cooperative lane change assistance or lane change warning, require very exact positioning of the respective vehicle, however, which frequently cannot be achieved with satellite-based locating and feasible complexity. The navigation for a vehicle could also be improved with more exact positioning, because the driving instructions could be given more precisely.

Within the context of a cooperative sensor system, it is possible to achieve very exact locating or positioning for road users. The operating principle of the cooperative sensor system is similar to a secondary radar, in which emitted radar waves are not scattered passively but rather are received actively and response waves are emitted.

WO 2009/074655 A1, which is incorporated by reference, describes a system for transmitting vehicle-related data using mobile communication devices, to which end two different communication units, each having an antenna, and an additional GPS module are provided. One of the two communication units is in the form of a WLAN-based communication unit, which would also allow ITS-G5 communication, for example, within the context of adhoc network communication. The other communication unit is in the form of a wireless entry and driving authorization unit (RKE, Remote Keyless Entry), all the communication units being actuated by a common central computer in the vehicle. This is complex because different communication units and paths need to be accommodated in the vehicle. Furthermore, the communication by the wireless entry and driving authorization unit is not sufficiently reliable for transmitting data which need to be used in safety devices.

SUMMARY OF THE INVENTION

It is therefore an aspect of the invention to provide more exact positioning than when the adhoc network communication is set up and to interchange the data required for this purpose with a high level of reliability within the context of vehicle-to-surroundings communication.

The invention achieves this by means of a method for positioning in vehicle-to-surroundings communication, in which a first sensor (S1) of a first communication subscriber uses a transmission and reception unit to emit a challenge pulse, to which a transmission and reception unit of a second sensor (S2) of a second communication subscriber responds with a response pulse, wherein the response pulse is received and evaluated by the first sensor (S1) and positioning is performed, wherein the transmission and reception units of the first and second sensors (S1, S2) use a frequency band (SCH2) which is reserved for vehicle-oriented safety applications, and the appropriately setup vehicle communication unit according a transmission and reception unit, a sensor and a computation unit, wherein the vehicle communication unit is set up to participate in adhoc network communication based on the ITS-G5 standard, wherein the computation unit is set up to carry out the method.

To this end, the invention proposes that the transmission and reception units of the first and second sensors of the different communication subscribers use a frequency band which is reserved for vehicle-oriented safety applications. Such a frequency band can be used for reliable communication, since this frequency band is reserved for appropriate applications. In addition, there are few collisions with other data packets since these have to side-step to other frequency bands if they are not transmitting data that are relevant to vehicle safety. Since safety applications in the vehicle are increasingly equipped with opportunities for vehicle-to-surroundings communication, it is possible to use the same transmission and reception units or antenna units both for the adhoc network communication and for the cooperative sensor communication.

According to one preferred embodiment, the C2X communication can be performed on the basis of the ITS-G5 standard (IEEE 802.11p). In this case, the IEEE 802.11p standard, as is currently provided according to ETSI, can involve the use of service channel 2 (SCH2) for improved positioning, said service channel being provided for the frequency range between 5.885 GHz and 5.895 GHz.

The other two channels provided within the context of the IEEE 802.11p standard (ETSI) are already in use within the context of the adhoc network communication. These are a supervisory or control channel (CCH) and service channel 1 (SCH1). Since vehicles increasingly need to be equipped with opportunities for adhoc network communication, this is a particularly favorable way of performing cooperative sensor communication at the same time and, according to aspects of the invention, using it to improve the positioning of the communication subscribers.

According to one preferred embodiment of the proposed method, the challenge pulse is provided with a PRN code (Pseudo Random Noise code) for the first sensor, which can be used both for interference-free communication and for identifying the first sensor. The response pulse from the second sensor is complemented particularly by an identification number, wherein the distance between the first and the second sensor is then ascertained from the propagation time of the challenge and response pulses. This allows the distance to be determined very exactly.

So as also to ascertain the angle between the first and second sensors, it is additionally proposed that the phase offset of the response pulse emitted by the second sensor between individual antenna sections, what are known as "patches" or catchment areas of the antenna, of a multiantenna array or a multifield antenna on the transmission and reception unit of the first sensor, i.e. the sensor receiving the response pulse, be measured and this be used in order to ascertain the angle between the first and second sensors.

Depending on the implementation, this cooperative sensor system can achieve relative positioning with an accuracy of 1 cm, for example, for an update rate of 100 Hz for unconcealed objects in the surroundings.

In order to allow a sufficiently large number of road users to ascertain the relative position with respect to one another, the invention can propose that the transmission and reception units of the first and second cooperative sensors, i.e. those participating in the communication, be assigned a communication timeslot by means of an allocation method. Within this timeslot, interference-free communication can then be performed.

In a development of the method according to aspects of the invention, the positioning derived from the challenge pulse from the first sensor and the response pulse from the second sensor from cooperative sensor communication can be associated with positioning from adhoc network communication, association being understood to mean particularly comparison of the various positionings, i.e. the different ascertained positions, and determination of an improved positioning.

In order to simplify the association, the invention can propose that the participants in the cooperative sensor communication and the adhoc network communication be assigned the same identification identifier.

According to aspects of the invention, the data from the cooperative sensor communication and the adhoc network communication can be associated as early as during the execution of the adhoc network protocol stack, since both types of communication use a technically comparable communication band. This significantly speeds up the positioning, but possibly also the transmission and evaluation of further information, such as other safety-related data.

To this end, the invention can provide that further information also be transmitted with the challenge and response pulses, said information being distributed quickly on account of the high update rate in the cooperative sensor communication. This additional information, may be, in particular, safety-related data such as static type identifiers (pedestrian, cyclist, car, HGV) or the like. Besides static data, dynamic data are also suitable, such as speed, acceleration, steering wheel angle, yaw rate, brake pedal position, indicator for path prediction, etc. The dynamic data can also include data which characterize the system behavior or the driving behavior, that is to say which show how objects behave. Thus, autonomously acting systems, such as emergency braking assistants, could send data which in each case describe actions planned in the future. This prediction then allows better reactions to be obtained in the case of the surrounding objects (communication subscribers) too. In this way, it is also possible to coordinate autonomous actions better.

There is therefore a general opportunity to cover safety-critical applications and the data required therefor using both the cooperative sensor system and vehicle-to-surroundings communications. Communication-encumbering mobility applications or preliminary analyses for a situation can then be handled by means of pure vehicle-to-surroundings communication.

In order to effectively use particularly the communication channel for cooperative sensor communication, the invention can provide that dynamic and/or static data be transmitted cyclically, with dynamic data also being able to be transmitted immediately in the event of a change. The transmission cycle for the other data can be interrupted for the immediate transmission. It is therefore also possible for dynamic data which typically change quickly or frequently not to be included in the usual transmission cycle. The latter may contain, in particular, static data such as mass, dimensions, object type, sign type in the case of signs, current and further traffic light phase in the case of traffic lights, etc.

In addition, the invention relates to a vehicle communication unit having a transmission and reception unit, possibly including an antenna unit, a sensor participating particularly in cooperative sensor communication, and a computation unit wherein the vehicle communication unit is set up to participate in adhoc network communication based on the ITS-G5 standard, wherein the computation unit is set up to carry out the method. The vehicle communication unit is set up to participate in adhoc network communication based on the ITS-G5 standard, that is to say particularly based on IEEE 802.11p in the frequency band between 5.875 GHz and 5.905 GHz. In addition, the computation unit of the vehicle communication unit is set up to carry out the method described above or portions thereof.

Correspondingly, the invention also relates to a computer program product which has program means for setting up the method proposed according to aspects of the invention on the computation unit of a vehicle communication unit.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
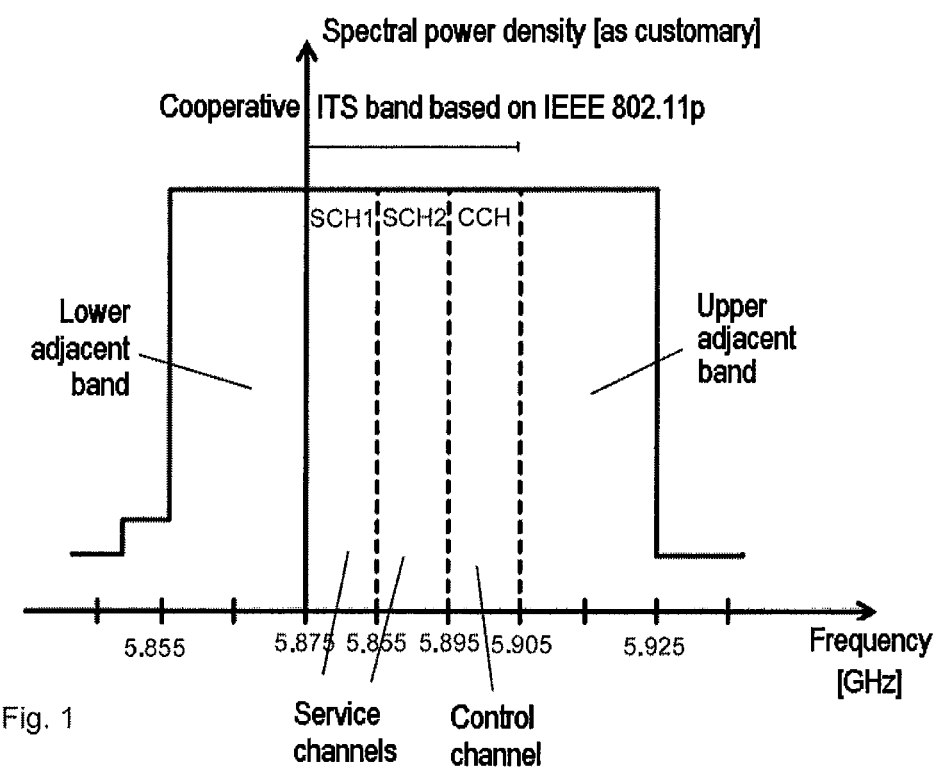
FIG. 1 shows a channel allocation for the vehicle-to-surroundings communication based on IEEE 802.11p.

FIG. 1 shows the channel allocation for the vehicle-to-surroundings communication within the context of the ITS standard based on ETSI for IEEE 802.11p as a spectral power density in arbitrary units as a function of the frequency in the unit GHz. The cooperative ITS band is situated at approximately 5.9 GHz and has two service channels SCH1 and SCH2 and a control channel CCH. This split is currently planned on the basis of the ETSI standard. This cooperative ITS frequency band having a width of 30 MHz has been approved in Europe exclusively for vehicle-oriented safety applications and, on the basis of current planning, is split into three channels of 10 MHz each, the vehicle-to-surroundings communication being based on a dual receiver concept, according to which two channels are always monitored. These are the control or supervisory channel CCH and one of the service channels, according to present discussions preferably the first service channel SCH1, that is to say the upper and the lower of the three channels in the cooperative ITS band. The frequency approval in the USA is similar, but 70 MHz are currently approved there.

The second service channel SCH2 in the frequency range from 5.885 GHz to 5.895 GHz is to all intents and purposes unused, since only two receivers are available. The cooperative ITS band is also surrounded by an upper adjacent band and a lower adjacent band with a width of 20 MHz each.

According to aspects of the invention, the second service channel SCH2 is intended to be used for the communications of the cooperative sensor system, particularly in order to improve the positioning of the vehicles or communication subscribers in the vehicle-to-vehicle communication, or more generally the vehicle-to-surroundings communication.

Figure 2:
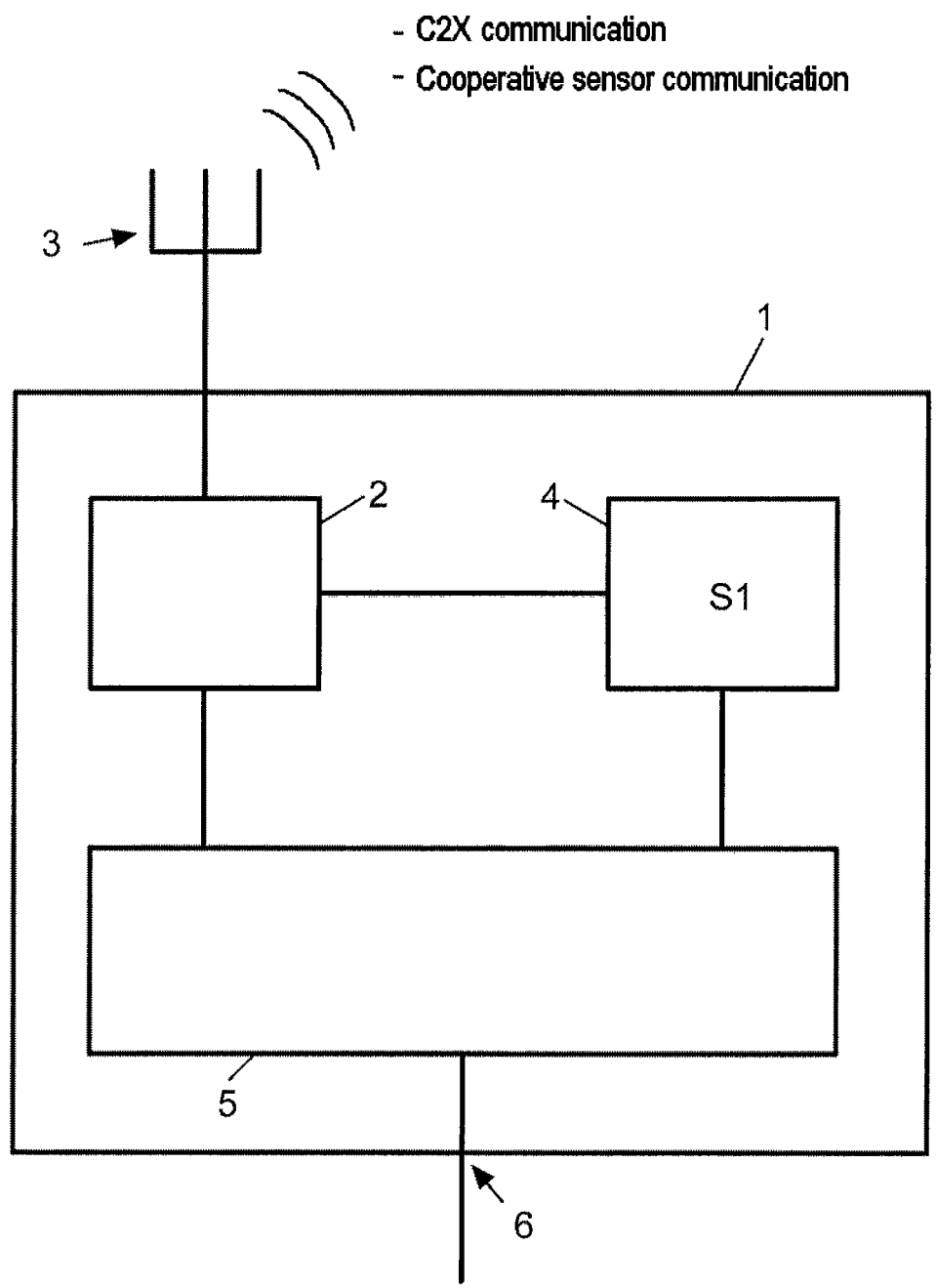
FIG. 2 schematically shows a vehicle communication unit according to aspects of the invention.

To this end, the vehicle communication unit 1 shown in FIG. 2 is proposed, which has a transmission and reception unit 2 having an integrated antenna unit. The integrated antenna unit also includes a multifield antenna 3 which is set up for communication in the range of 5.9 GHz and undertakes both the vehicle-to-vehicle communication and the cooperative sensor communication of the vehicle communication unit 1. In this case, the vehicle communication unit may be distributed as a logical unit over different vehicle units and does not necessarily have to be accommodated in a common housing.

In addition, the vehicle communication unit 1 has a sensor 4 participating in cooperative sensor communication and a computation unit 5. The vehicle communication unit 1 is set up to participate in adhoc network communication based on the ITS-G5 standard, that is to say particularly based on the IEEE 802.11p standard in the frequency band between 5.875 GHz and 5.905 GHz.

The computation unit 5 is also set up to perform the method—described more exactly below—for positioning in vehicle-to-surroundings communication and may be connected to other vehicle units in the vehicle via a vehicle port 6 to a vehicle communication network, particularly a bus system. Said vehicle units include particularly safety units with driver assistance systems.

Figure 3:
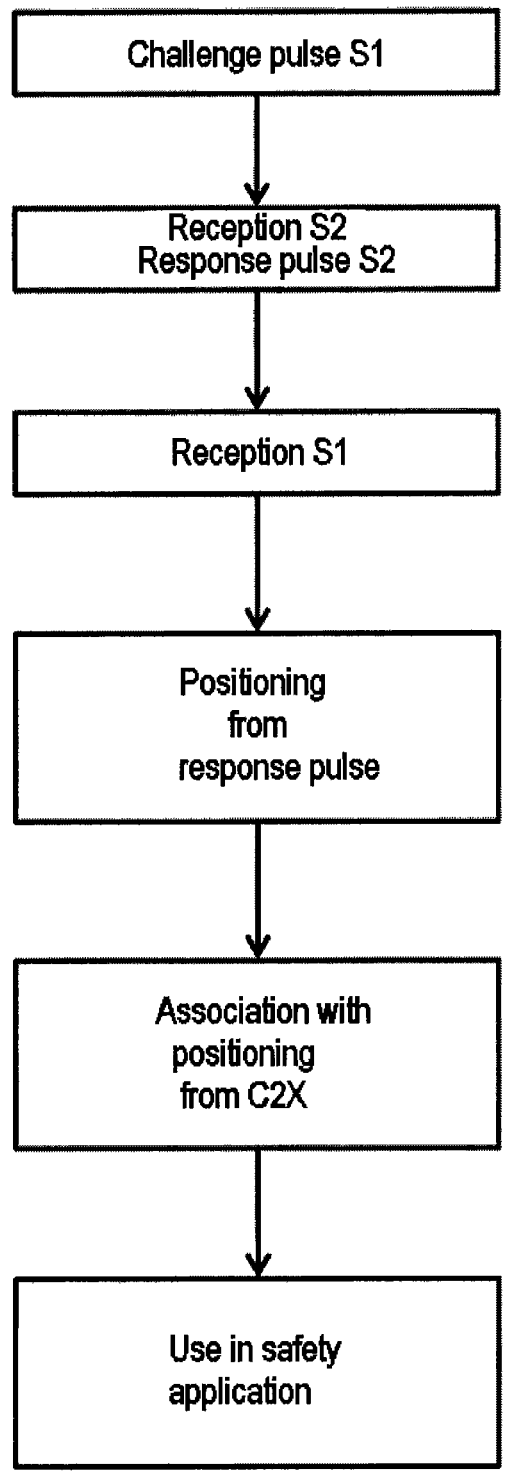
FIG. 3 shows a schematic flowchart for the method proposed according to aspects of the invention.

The method is explained in more detail below with reference to FIG. 3.

The cooperative sensor 4, subsequently also called S1 for the first vehicle, uses the transmission and reception unit 2 and the multifield antenna 3 to emit a challenge pulse, provided with a PRN code (Pseudo Random Noise code), on the basis of the principle of a secondary radar method. This challenge pulse is received by a second cooperative sensor 4 of another subscriber, which may be integrated in a similar vehicle communication unit 1 in another vehicle, for example. This second cooperative sensor is subsequently also called S2.

During the processing of this challenge pulse, the challenge pulse is provided at least with an identification number from the second cooperative sensor S2 and is returned as a response pulse to the first cooperative sensor S1. In this regard, the response pulse is received by means of the multifield antenna 3 and the transmission and reception unit 2 and is decorrelated by the cooperative sensor S1, i.e. the PRN code is translated into data information.

On the basis of prior knowledge about the processing time of the challenge pulse in the second cooperative sensor S2 or the transmission and reception unit thereof, it is possible to use the time at which the challenge pulse is sent and the response pulse is received to ascertain the propagation time for the pulse and to use this to determine the distance between the first cooperative sensor S1 and the second cooperative sensor S2.

A second measurement method is used to ascertain the angle between the two cooperative sensors S1 and S2. In this regard, the phase offset of the returned wave between the individual catchment areas or patches of the multifield antenna 3 on the receiving transmission and reception unit 2 of the cooperative sensor 4 (S1) is calculated using a numerical method.

As a result, the exact positioning is derived from the received response pulse. This can be done in the computation unit 5.

In summary, a challenge pulse is thus emitted by the first cooperative sensor S1 and received by the second cooperative sensor, which then emits a response pulse S2 complemented by an identification number. The response pulse is received by the first cooperative sensor S1, said response pulse then being used to position the second cooperative sensor relative to the first cooperative sensor.

Preferably, this position derived from the cooperative sensor communication on the basis of the secondary radar principle is associated with a position which is ascertained within the context of the customary C2X communication on the basis of the ITS standard and which is required for executing the adhoc network communication stack on the basis of the ITS standard for setting up the adhoc radio communication network. This association means, in particular, comparison and improvement of the positioning.

According to aspects of the invention, this can also be performed in the computation unit 5, which then outputs the improved positioning via the port 6 to downstream safety applications, for example a junction and turning assistant in a safety vehicle unit. For the association, it makes sense if the identification numbers of the different subscribers in the vehicle-to-surroundings communication based on the ITS standard and in the cooperative sensor communication are the same.

The use of the protected frequency range in the second service channel SCH2 at just under 5.9 GHz allows an improvement in the interference immunity of the cooperative sensor communications or sensor system. The combination with the vehicle-to-surroundings communication based on the ITS standard gives rise to a system with very good locating and the opportunity for data interchange even for relatively large files, as are necessary for mobility applications, for example. These are preferably then transmitted using customary C2X communication.

A specific instance of application is described below. In the case of a left turn assistant, a warning is given if the individual vehicle wants to turn left and in so doing crosses the path of an oncoming vehicle, as a result of which it will collide therewith. This requires very exact positioning for both vehicles. The vehicle-to-surroundings communication based on the ITS standard interchanges data between the individual vehicles in the surroundings on a supervisory or control channel CCH, said data also containing the positioning from the satellite locating, for example the GPS position.

In addition, according to aspects of the invention, positioning and further data interchange take place within the context of the cooperative sensor system. This involves the data being validated between the C2X communication and the cooperative sensor communication. The improved positioning derived therefrom ensures that the vehicles can be located in an exact lane and that no further sensor system for performing the left turn assistance is required in order to be able to output a relevant warning.

At present, the position information from the satellite locating is checked and confirmed by means of Radar, Lidar or cameras, for example. This could be avoided using the method according to aspects of the invention.

LIST OF REFERENCE SYMBOLS

1 Vehicle communication unit
2 Transmission and reception unit
3 Multifield antenna
4 Cooperative sensor S1 or S2
5 Computation unit
6 Port
S1 First cooperative sensor
S2 Second cooperative sensor

The invention claimed is:

1. A method for positioning in vehicle-to-surroundings communication, the method including:
controlling, by a first sensor of a first communication subscriber, a first transmission and reception unit to emit a challenge pulse including a first code;
receiving, by the first transmission and reception unit, a response pulse from a second transmission and reception unit controlled by a second sensor of a second communication subscriber, the response pulse including a second code and an identification number identifying the second sensor; and
evaluating, by a computation unit controlled by the first sensor, the response pulse to determine a position of the second sensor relative to a position of the first sensor, the transmission and reception units of the first and second sensors using a frequency band (SCH2) which is reserved for vehicle-oriented safety applications.

2. The method as claimed in claim 1, wherein the IEEE 802.11p standard involves the use of service channel 2 (SCH2).

3. The method as claimed in claim 1, wherein the challenge pulse is provided with a PRN code for the first sensor and the response pulse is complemented by an identification number from the second sensor, wherein a distance between the first and the second sensor is ascertained from a propagation time of the challenge and response pulses.

4. The method as claimed in claim 1, wherein a phase offset of the response pulse from the second sensor between individual antenna sections of a multifield antenna on the transmission and reception unit of the first sensor is ascertained in order to ascertain an angle between the first and second sensors.

5. The method as claimed in claim 1, wherein the transmission and reception units of the sensors are assigned a communication timeslot by means of an allocation method.

6. The method as claimed in claim 1, wherein the positioning derived from the challenge pulse from the first sensor and the response pulse from the second sensor as from cooperative sensor communication is associated with positioning from adhoc network communication.

7. The method as claimed in claim 6, wherein the participants in the cooperative sensor communication and the adhoc network communication use a same identification identifier.

8. The method as claimed in claim 6, wherein the data from the cooperative sensor communication and the adhoc network communication are associated during the execution of the adhoc network protocol stack.

9. The method as claimed in claim 1, wherein further information is also transmitted with the challenge and response pulses.

10. The method as claimed in claim 9, wherein dynamic and/or static data are transmitted cyclically as further information, with dynamic data being transmitted immediately in the event of a change.

11. A vehicle communication unit having a transmission and reception unit, a sensor and a computation unit, wherein the vehicle communication unit is set up to participate in adhoc network communication based on the ITS-G5 standard, wherein the computation unit is set up to carry out the method as claimed in claim 1.

* * * * *